United States Patent [19]
Ellis

[11] 3,988,529

[45] Oct. 26, 1976

[54] TELEVISION TRANSMISSION

[75] Inventor: Alfred Brian Edwin Ellis, Chelmsford, England

[73] Assignee: The Marconi Company Limited, Chelmsford, England

[22] Filed: Dec. 9, 1974

[21] Appl. No.: 530,548

[30] Foreign Application Priority Data
Jan. 23, 1974 United Kingdom.............. 3101/74

[52] U.S. Cl. .......................... 178/6; 178/DIG. 3; 178/DIG. 24
[51] Int. Cl.² ......................................... H04B 3/30
[58] Field of Search............ 178/DIG. 3, 6, DIG. 24

[56] References Cited
UNITED STATES PATENTS

| | | | |
|---|---|---|---|
| 2,940,005 | 6/1960 | Toulon......................... | 178/DIG. 3 |
| 3,299,204 | 1/1967 | Cherry et al.................. | 178/DIG. 3 |
| 3,309,461 | 3/1967 | Deutsch........................ | 178/DIG. 3 |
| 3,324,237 | 6/1967 | Cherry et al.................. | 178/DIG. 3 |
| 3,769,452 | 10/1973 | Stone............................. | 178/DIG. 3 |
| 3,810,174 | 5/1974 | Heald et al. ................. | 178/DIG. 24 |

Primary Examiner—Robert L. Griffin
Assistant Examiner—Michael A. Masinick
Attorney, Agent, or Firm—Baldwin, Wight & Brown

[57] ABSTRACT

A method of reducing the transmission bandwidth for television pictures is described in which the frame is divided into at least three fields each consisting of picture information from an apparently random distribution of picture elements and the transmitted signals are obtained by sampling the video output of a line scanned television camera as the scanning spot passes each of the picture elements. Usually no picture element will be sampled more than once during the formation of a complete frame and therefore each line scanning field contributing to the picture will consist of information from a different set of randomly distributed elements.

16 Claims, 3 Drawing Figures

TELEVISION TRANSMISSION

This invention relates to methods of television transmission.

In one known method television pictures are scanned, both in the camera and the receiver, by an electron beam, in a series of horizontal spaced parallel lines, a complete frame being composed of two complete scanning fields with the lines of one field interlaced with the line of the other field.

In Great Britain two picture standards are employed, the first in which a complete picture consists of 405 scanning lines and the second employing 625 scanning lines. By way of example only and for the purposes of ease of explanation, the following discussion will be given assuming 625 lines per complete picture.

In order to avoid visible flicker it is necessary that a number of scanning fields be completed each second and in both the 405 and 625 line systems a 50 field per second rate is used. Since with the above described line scanning systems 50 complete fields must be transmitted each second, to receiving equipment, a relatively large transmission bandwidth is required.

A known alternative television transmission method to the above described is one commonly referred to as the "Random Scan" system. In such a system a frame is considered as being made up of a number of elemental areas and these elemental areas are sampled individually by a scanning spot which moves in an apparently random manner. over the picture area until a complete field has been assembled when the process is repeated. A 625 line, 50 field per second picture can be considered as consisting of about 400,000 elemental areas i.e. with a picture aspect ratio of 4:3, 695 elemental areas in one co-ordinate direction and 575 in the other co-ordinate direction, and therefore the random scan system considered will also be assumed to have the same number of elemental areas.

The response time of the human eye, to movement is about 0.25 seconds and in the random scan system a "steady" picture is obtained by scanning all elemental areas in a time of 0.25 seconds or in other words at a picture rate of 4 Hz.

A comparison of required transmission bandwidth can now be made between the line scanning method described above and the random scan system. In the line scanning method the picture rate is 25 Hz as compared with the required 4 Hz for the random scan system giving a data rate reduction of about 6 times for the random scan system. Such a reduction means that the required transmission bandwidth can be cut by a factor of 6, or a higher definition picture can be obtained for the same bandwidth. An additional advantage of the random scan system is the greater noise rejection properties resulting from the spreading of interference around the display screen in a random fashion.

Although the random scan system has considerable advantages over a line scanning method in respect of transmission bandwidth and noise, there are considerable practical difficulties in putting the system into practice. Random scan requires as a necessity, high speed deflection circuits in both pick up and display tubes making electrostatic deflection imperative. The scanning spot must of necessity be able to cover the full scanning area in under 0.6 μS. Such deflection systems are both complex and costly to produce. In addition difficulties arise where it is required to introduce some random scanned units into a system already operating on a line scanning basis.

This invention seeks to provide a method of reducing transmission bandwidth in which the above mentioned difficulties are mitigated.

According to this invention there is provided a method of reducing the transmission bandwidth in a television transmitter, in which each frame is built up of three or more fields each consisting of picture information derived from a predetermined number of elemental areas distributed over the picture in a manner which appears random to the eye and in which the transmitted signals are derived by sampling the video output of a line scanned television camera as the scanning spot passes each of said elemental areas.

Normally, in order to avoid unnecessary use of available bandwidth the video output is sampled once and only once for each elemental area over the duration of the fields utilized for the construction of a complete picture.

Advantageously the video output from each sampled elemental area is converted to a digitally coded word before transmission.

In the interest of obtaining a picture in which the possibility of noticeable discontinuities in continuous movement is reduced the total duration of the fields utilized for the construction of a complete picture should be chosen to be less than the response time of the eye to movement and the elemental areas sampled during consecutive fields should have no apparent relationship with one another.

Preferably the elemental areas which make up a complete picture are arranged in groups of a predetermined number of elemental areas and one elemental area is sampled from each group scanned by the scanning spot during each field, the particular elemental area sampled in consecutively scanned groups being chosen in accordance with a pseudo-random sequence of numbers.

Conveniently in a picture signal generating apparatus in accordance with the present invention there is provided a first counter which is advanced for each count by a number equal to said predetermined number of elemental areas, an adder for adding to the output of the first counter a number fed from a first pseudo-random number generator arranged to provide, for each count of the first counter, a different number from a pseudo-random sequence of numbers, a second counter for providing a count representative of the elemental area at any instant passed by the scanning spot and a comparator arranged to receive on respective inputs the count of the second counter and the output from the adder and to provide an output when counts at the two inputs are equal.

The random sequence of numbers is preferably a cyclically repeating sequence of as many numbers as there are elemental areas within a group each number being representative of the position within the group of a respective elemental area.

Advantageously the output of the comparator is fed to means for sampling the video output of the camera.

To ensure that such elemental area is sampled once and only once during the transmission of a complete picture, the starting position within the cyclic sequence may be changed after the scanning spot has passed all the elemental areas in the complete picture.

Alternatively the total number of elemental areas in a complete picture may be chosen to be non-divisible by the number of elemental areas in each group.

The transmitted video information may be utilized at a receiving terminal in a display arrangement operating on either a line scanned or a random scan basis.

In the case of a line scanned display method there is provided a store having a respective store address for picture information from each elemental area of the complete picture, the video information from respective elemental areas being directed after decoding to the appropriate store address.

Conveniently the appropriate store address is derived by means of a third counter substantially identical to and running synchronously with said first counter, a second pseudo-random number generator substantially identical to and running synchronously with said first pseudo-random number generator and a second adder receiving on respective inputs the outputs of the third counter and the second pseudo-random number generator, the output of the adder providing an address input to the store.

Preferably both the third counter and second pseudo-random number generator receive a transmitted-word synchronising signal derived from the transmitted elemental word to respectively advance the count of the third counter and to advance the second pseudo-random number generator to provide the next number in the sequence, and a frame start signal to reset both to a starting position.

This invention will now be further described with reference to the accompanying drawings in which.

In describing this invention the television camera will be considered as operating with 625 scanning lines per complete picture, which may consist of two fields of interlaced lines, at a rate of 50 fields per second, although it must be understood that the invention is applicable to any known line scanned system.

In accordance with this invention the picture is notionally divided into a matrix of elemental areas. Instead of obtaining a continuous video output from the camera as the scanning beam passes each and every elemental area, so as to complete the transmission of a picture in two fields, the video output is sampled as the beam passes selected elemental areas, the areas sampled each field being distributed over the picture area in an apparently random manner (i.e. to appear random to the eye).

When the line scan has completed the traverse of the picture area i.e. after a scanning field, a further randomly distributed set of elemental areas are selected for sampling during the next scanning field.

This process is repeated for a number of fields with a different set of elemental areas being sampled each frame until all elemental areas, from which the picture is constructed, have been sampled, when the entire process is repeated.

Figure 1:
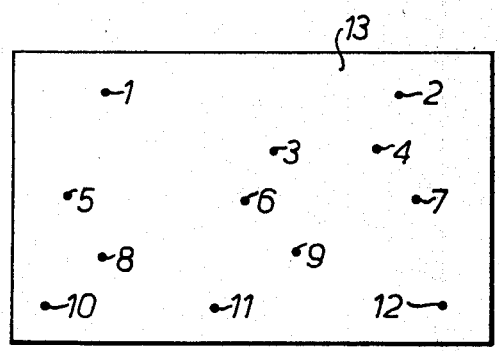
FIG. 1 is a highly schematic explanatory figure.

The sampling is illustrated in the explanatory FIG. 1 in which there is illustrated a typical scanning field. In this example twelve elemental areas are chosen for sampling (in a practical system there would be many more of course e.g. typically 33,333) and are distributed over the frame area defined by rectangular area generally designated 13 in a manner which appears to the eye to be random.

Assuming that the line scanning spot commences its scan at the top left hand corner of the area 13 as viewed in the figure, the spot will traverse the frame area without any video output being taken from the camera, albeit that the camera is a normal line scanned camera as known per se providing a continuous video output, until the scanning spot reaches the first selected area 1 when the video output is sampled. No further output is taken until area 2 is reached when a second sample is taken and so on until all the 12 shown areas have been sampled.

At the end of the field, the scanning spot will return to the starting position and scan a further field which may, as is common, be interlaced with the previous field, and in which a different set of elemental areas is sampled. To ensure that available bandwidth for transmission is efficiently utilized each area is sampled once and only once i.e. the areas sampled from each field form a unique set.

Provided that all elemental areas are sampled in a time less than the 0.25 second response time of the eye to movement and that there is no apparent relationship between the elemental areas sampled in succeeding fields, the the picture displayed after transmission will be sensibly free from visible flicker. The picture information transmitted to the receiving treminal can be utilized in either a line scanned or a random scan display system.

In a practical case the frame is considered as being constructed from approximately 400,000 elemental areas. Each field of the television camera, operating at 50 fields per second occupies 20ms and to sample all elemental areas of the frame to obtain full use of the available 250ms sampling time, 12 complete fields are required, occupying a time of 240ms.

If 400,000 elemental areas are sampled in 240ms then in each field of duration 20ms, approximately 33,333 areas are sampled. The 33,333 areas sampled each field are distributed over the picture to appear random to the eye.

Since the distribution of areas sampled during any field, is substantially random there will be no error in assuming that areas are sampled at a mean rate but with a superimposed random spread. In other words the elemental areas can be notionally divided into groups each containing n areas with one area from each group sampled each time the group is passed by the scanning spot. The superimposed random spread is obtained by varying from group to group in an apparently random manner, the particular elemental area sampled.

In the present example, assuming an interlaced scan, 200,000 elemental areas will be passed by the scanning spot each field and therefore the mean sample rate will be one sample every six elemental areas. In other words n is six and the particular element sampled within a group of elements each field in which that group is scanned is varied from 0 to 5 in a random manner.

In this way the equipment required to perform the invention is greatly simplified.

Figure 2:
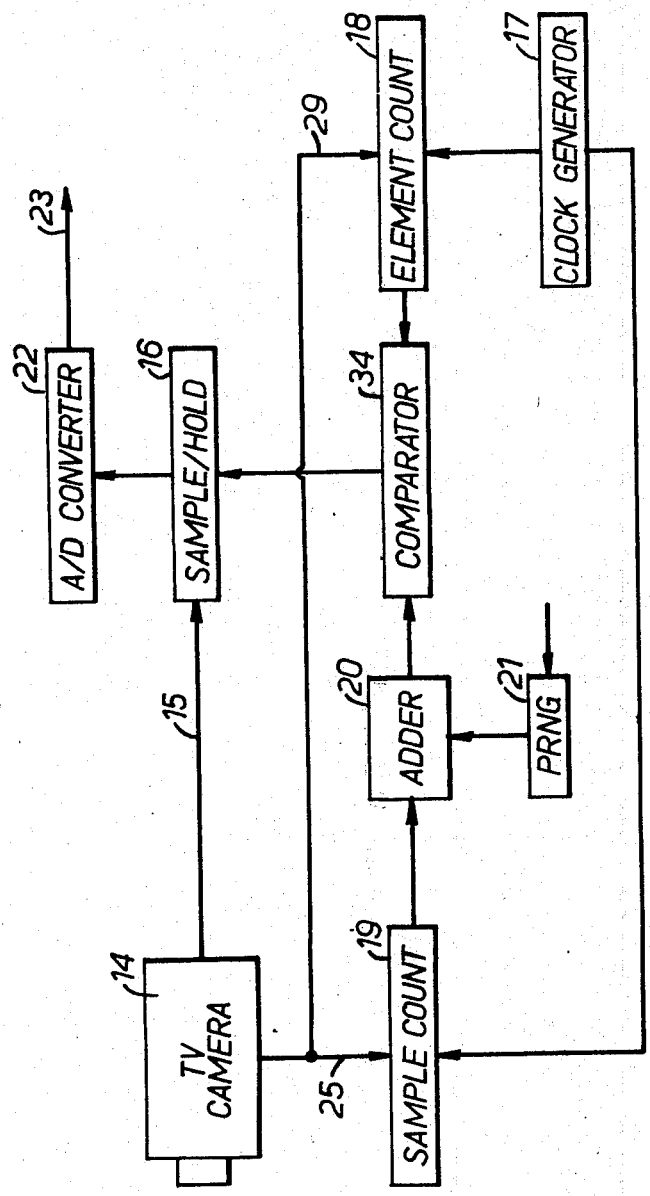
FIG. 2 shows highly schematically a transmitting terminal employing the present invention and, FIG. 3 is a highly schematic illustration of a receiving terminal for receiving transmitted signals from the arrangement of FIG. 2 and for displaying television pictures on a line scanning basis.

A transmitting terminal embodying the present invention is illustrated in FIG. 2 of the accompanying drawings.

Referring now to FIG. 2, there is provided a line scanned television camera 14 as known per se. The camera 14 provides video output on line 15 to one input of a sample and hold circuit 16 which is arranged to sample the video output in a manner to be described. A clock generator 17 is provided to run synchronously with the line scan of the camera 14 and the output of the generator 17 is counted by a counter 18. The count of the counter 18 is therefore at any instant representative of the number (from 0 to 400,000) of the elemental area being passed at that instant by the scanning beam and the clock generator 17, therefore effectively divides the picture, over a period of two fields, into the required matrix of elemental areas.

A sample counter 19 is also fed with the output of the clock generator 17 and is arranged to advance, for each count, by a number equal to the average number of elemental areas between samples, which in the present example is six, up to a maximum count of 400,000. The output of the sample counter 19 is fed to one input of an adder 20, to the other input of which is fed the output of a pseudo-random number generator 21. The count of the sample count is therefore the number (from 0 to 400,000) of the first elemental area of the group of six areas and the actual number of the elemental area to be sampled is obtained by the addition of an integer of value between 0 to 5 inclusive, provided by the pseudo-random number generator 21.

The output of the adder 20 is therefore the number of the area to be next sampled. The pseudo-random number generator 21 may be formed by a feedback connected shift register as known per se containing the integer 0 to 5 inclusive arranged in a pseudo-random sequence such as for example 532014. Each time the counter 19 advances, the sequence advances to the next number for adding into the adder 20 until each number has been selected in turn when the cycle repeats i.e. for the first count of the sample counter the fifth elemental area from the zero or datum area is sampled, for the next count the third area and so on, the cycle repeating every six counts of the counter 19. The output from the adder 20 is fed to one input of a comparator 34 the other input of which receives the output of the elemental area counter 18. When the counter 18 reaches a count equal to the output of the adder 20, the comparator 34 provides an output signal to the sample and hold circuit 16 and the video output from the camera 14 is sampled at the point reached in the scanning sequence. The sampled video from the circuit 16 is fed to an analogue-to-digital converter 22 which converts the video signal to a digital code for transmission and feeds this coded signal over line 23 to the transmitter (not shown).

By this method, at the end of a field, video information from 33,333 elemental areas distributed apparently randomly over the picture area will have been transmitted.

Sampling is continued in identical manner for the next field, which will be interlaced with the first, and a second set of randomly distributed elemental areas will be sampled.

At the end of two fields each elemental area in the picture will have been passed once by the line scan (albeit not necessarily sampled) and the element counter 18 will have reached a count of 400,000. The counter 18 is therefore rest to zero by an input on line 29. The sample counter 19 will also have reached its maximum count of 400,000 but in steps of six, and is also reset to zero by an input at line 25, and 66,666 elemental areas have been sampled (33,333 each field).

In order not to use available bandwidth unnecessarily, it is essential that each elemental area in the picture be sampled once and only once in the duration of the twelve fields utilized for the sampling of a complete picture. In the present example, the total number of elemental areas is chosen to be 400,000 which is not divisible by the number, six, of areas in a group. In this case, when the scanning spot returns to its original starting position after two fields, the pseudo-random number generator will of necessity (since it contains six numbers) be at a different position in the repeating cycle. It is therefore assumed that each elemental area is sampled only once over the twelve fields and only at the end of the twelve frames will both scanning spot and generator 21 be in their respective original positions at the same time.

If the total number of elemental areas is divisible by the number of areas in a group, then the generator 21 can be advanced one position in the sequence at the end of every two fields. The sequence will then become 320145 and after four fields will become 201453 and so on.

At the receiving terminal, the received video information can be displayed on either a line scan or a random scan basis.

Figure 3:
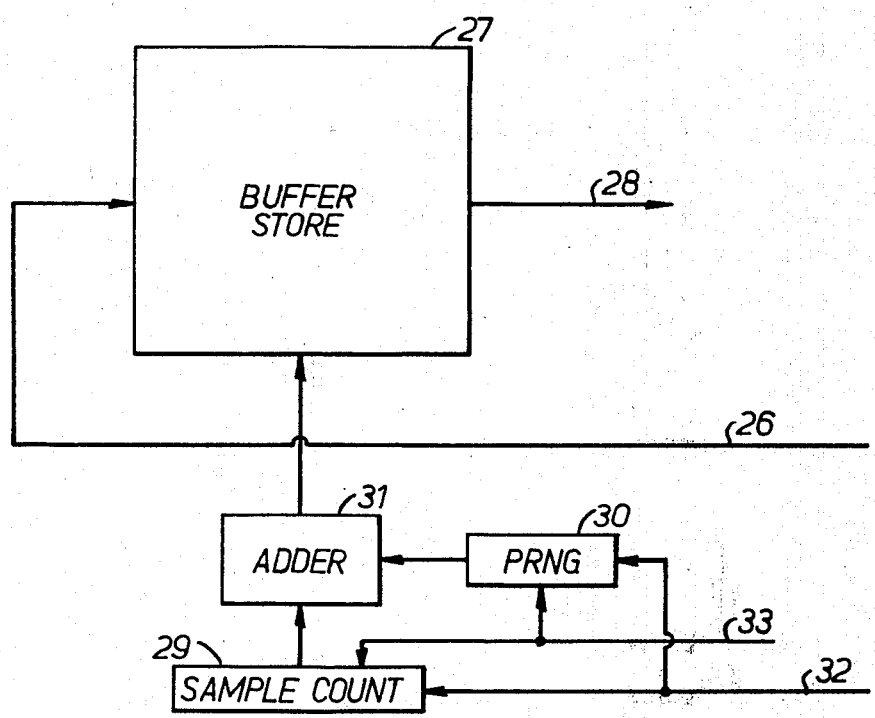

FIG. 3 shows a receiving terminal suitable for use for displaying the received information on a line scan basis. Referring now to FIG. 3, received video information from sampled elemental areas is, after decoding, passed via line 26 to an input of a buffer store 27. The store 27 has at least 400,000 words of storage, there being stored at respective addresses the video sample obtained from respective elemental areas. The store 27 is of a type well known in the art and requires no further description here. The store 27 is addressed in a manner well known per se, continuously on a line scanning basis for the display of the stored video information.

Each sample of video information received from a particular elemental area is directed to the store position corresponding to that position in the complete picture, from which the sample was obtained and refreshes the stored information. It is therefore necessary at the receiving terminal to determine the number (i.e. address) of the appropriate elemental area from which an incoming sample of video was obtained.

There is therefore provided a sample counter 29 and a pseudo-random number generator 30 each identical to and running synchronously with respective units, counter 19 and generator 21 at the transmitter. The outputs from generator 30 and counter 29 are fed to respective inputs of an adder 31 the output of which is fed to the store 27 as the address to which the video sample entering on line 26 is to be directed.

Both the sample counter 29 and the pseudo-random number generator 30 receive via line 32 word synchronising signals transmitted over the communications link, to cause each unit to advance one position in the sampling sequence in synchronism with the corresponding units 19 and 21 respectively in the transmitting terminal. In addition both units 29 and 30 receive over line 33, a frame start signal to reset them to a common starting position. Although these synchronising signals require transmission bandwidth they occupy only a small proportion of the total frame time. In addition the word synchronisation is conveniently provided in the case of digitally coded signals by the usual communication link synchronisation.

If random scan display is required, the 33,333 video samples transmitted each field, are stored in order of sampling in a buffer store having 33,333 words of storage. This store can then be easily addressed in a manner known in the random scan art, simple circuitry being provided for deriving, from knowledge of which field number within the twelve fields is being scanned, and the sample number randomly selected for display, the actual address on the viewing screen of the elemental area corresponding to the selected sample.

It can therefore be seen that the invention provides a method of reducing transmission bandwidth required for a complete picture, since a single picture is transmitted in the 240 ms utilized in a normal line scanned system for the transmission of six pictures. Flicker should not be observed since samples within a field are randomly distributed and there is apparent randomness between fields. In addition the need for high speed electrostatic deflection systems in both camera and displays, as required in known random scan systems, is avoided and the method is compatible with known line scanning systems.

Although the invention has been described for ease of explanation with reference to a 625 line 50 field per second interlaced system, it must be understood that the invention is in no way limited to such a system.

I claim:

1. A method reducing the transmission bandwidth in a television transmitter in which each frame is built up of at least three fields each consisting of video information derived from a predetermined number of elemental areas distributed over the frame in a manner which appears random to the eye, comprising the steps of:
   a. line scanning a television camera so that the scanning spot repetitively passes a large number of elemental areas during a frame period;
   b. sampling the video output of said camera at a rate during each field period such taht the video outputs of one elemental area in each of a large number of successive groups of elemental areas are sampled during each field period; and
   c. controlling the sampling between the successive groups of each field such that the particular elemental area sampled in each successive group is chosen in accord with a pseudo-random sequence of numbers.

2. A method as claimed in claim 1 in which the video output is sampled once and only once for each elemental area over the duration of the fields utilized for the construction of a complete frame.

3. A method as claimed in claim 1 in which the video output from each sampled elemental area is converted to a digitally coded word before transmission.

4. A method as claimed in claim 1 in which the total duration of the fields utilized for the construction of a complete frame is chosen to be less than the response time of the eye to movement and the elemental areas sampled during consecutive fields have no apparent relationship with one another.

5. Picture signal generating apparatus for connection to a line scanned television camera, comprising a first counter for counting in synchronism with the line scan to divide a scanning frame into a predetermined number of elemental areas; a further counter for advancing each count by a further predetermined number of elemental areas to form groups of said further predetermined number of elemental areas; a first pseudo-random number generator providing for each count of said further counter an output of a different number from a pseudo-random sequence of numbers; an adder connected to add the output of the pseudo-random number generator and the count of said further counter and to provide a sum output; and a comparator having respective inputs connected to the sum output of the adder and said first counter and having a sampling output providing a signal when the respective inputs are equal, whereby to cause video sampling of the elemental area indicated by the first counter.

6. Apparatus as claimed in claim 5 in which the random sequence of numbers is a cyclically repeating sequence of as many numbers as there are elemental areas within a group each number being representative of the position within the group of a respective elemental area.

7. Apparatus as claimed in claim 5 in which the output of the comparator is fed to means for sampling the video output of the camera.

8. Apparatus as claimed in claim 5 in which the starting position within the cyclic sequence is changed after the scanning spot has passed all the elemental areas in the complete frame.

9. Apparatus as claimed in claim 5 in which the total number of elemental areas in a complete frame is chosen to be non-divisible by the number of elemental areas in each group.

10. In a television receiver, an input line receiving video output signals on a line scanned basis in which the video output signals of each field consist of samples corresponding to one elemental area of each of a group of successive groups of elemental areas where the particular elemental area sampled in consecutive groups in chosen in accord with a pseudo-random sequence of numbers, the combination of:
    a buffer store connected to said input line; and
    means providing address input to said buffer store for causing the buffer store to output said video output signals in proper sequence for video display.

11. In a television receiver as defined in claim 10 wherein the means last mentioned comprises a counter having a count output corresponding to the position of each elemental area within the frame, pseudo-random number generating means for producing an output which is said pseudo-random sequence of numbers, and an adder receiving the outputs of said counter and said pseudo-random number generating means.

12. A picture generating apparatus comprising, in combination:
    picture signal generating apparatus for connection to line scanned television camera, comprising a first counter for counting in synchronism with the line scan to divide a scanning frame into a predetermined number of elemental areas; a further counter for advancing each count by a further predetermined number of elemental areas to form groups of said further predetermined number of elemental areas; a first pseudo-random generator providing for each count of said further counter an output of a different number from a pseudo-random sequence of numbers; an adder connected to add the output of the pseudo-random number generator and the count of said further counter and to provide a sum output; and a comparator having respective inputs connected to the sum output of the adder and said first counter and having a sampling output providing a signal when the respective inputs are equal, whereby to cause video sampling of the elemental area indicated by the first counter; and display means for displaying a picture from the video signals of said picture signal generating apparatus, said display means comprising a store having a respective store address for picture information from each elemental area of the complete picture, the video information from respective elemental areas being directed after decoding to the appropriate store address.

13. Apparatus as claimed in claim 12 in which the appropriate store address is derived by means of a third counter substantially identical to and running synchronously with said first counter, a second pseudo-random number generator substantially identical to and running synchronously with said first pseudo-random number generator and a second adder receiving on respective inputs the outputs of the third counter and the second pseudo-random number generator, the output of the adder providing an address into to the store.

14. Apparatus as claimed in claim 13 in which both the third counter and second pseudo-random number generator receive a transmitted-word synchronising signal derived from the transmitted elemental word to respectively advance the count of the third counter and to advance the second pseudo-random number generator to provide the next number in the sequence, and a picture start signal to reset both to a starting position.

15. The method of reducing the transmission bandwidth in a television transmitter, which comprises the steps of:
 a. line scanning a television camera to produce video outputs corresponding to a large number of elemental areas distributed uniformly over the frame area during each field period;
 b. sampling a portion only of the video outputs of the camera during each of a plurality of consecutive groups of outputs for each field; and
 c. controlling the sampling of step (b) such that:
  i. the video outputs sampled during each consecutive group of each field correspond to a pseudo-random sequence of said elemental areas, and
  ii. the video outputs corresponding to all of said elemental areas are sample during said different field periods.

16. The method as defined in claim 15 wherein there are n of said different field periods and in which the control of step (c) is effected by dividing said large number of elemental areas into successive groups of n elemental areas and sampling the video output corresponding to only one elemental area of each group during each of said n different field periods such that said pseudo-random sequence is composed of a pseudo-random sequence within successive sets of n groups.

* * * * *